US012761858B2

(12) United States Patent
Oosthoek

(10) Patent No.: US 12,761,858 B2
(45) Date of Patent: Oct. 13, 2026

(54) ELECTRONIC SHELF LABEL WITH INTERACTION INTERFACE ACTIVATION

(71) Applicant: VusionGroup GmbH, Fernitz-Mellach (AT)

(72) Inventor: Jan Oosthoek, Landsmeer (NL)

(73) Assignee: VusionGroup GmbH, Fernitz-Mellach (AT)

( * ) Notice: Subject to any disclaimer, the term of this patent is extended or adjusted under 35 U.S.C. 154(b) by 67 days.

(21) Appl. No.: 17/786,027

(22) PCT Filed: Dec. 20, 2019

(86) PCT No.: PCT/EP2019/086875

§ 371 (c)(1),
(2) Date: Jun. 16, 2022

(87) PCT Pub. No.: WO2021/121643

PCT Pub. Date: Jun. 24, 2021

(65) Prior Publication Data

US 2022/0374185 A1 Nov. 24, 2022

(51) Int. Cl.
*G06K 19/06* (2006.01)
*G06F 3/147* (2006.01)
(Continued)

(52) U.S. Cl.
CPC ............. *G06F 3/147* (2013.01); *G09G 5/005* (2013.01); *G09G 2370/16* (2013.01); *G09G 2380/04* (2013.01)

(58) Field of Classification Search
CPC ........................................................ G06F 3/147
(Continued)

(56) References Cited

U.S. PATENT DOCUMENTS 5,448,226 A * 9/1995 Failing, Jr. ............. G06Q 30/02
340/5.91
7,152,040 B1 * 12/2006 Hawthorne ........ G06Q 30/0207
705/14.1

(Continued)

FOREIGN PATENT DOCUMENTS

DE 112018000730 B4 10/2019

OTHER PUBLICATIONS

An Office Action mailed by China National Intellectual Property Administration on Aug. 20, 2024, which corresponds to Chinese Patent Application No. 20198013163.3 and is related to U.S. Appl. No. 17/786,027; with. English language translation.

(Continued)

*Primary Examiner* — Talia F Crawley
(74) *Attorney, Agent, or Firm* — Studebaker Brackett PLLC

(57) ABSTRACT

An electronic shelf label that comprises a display unit that is adapted to display an image, wherein the electronic shelf label is adapted to operate in a customer-oriented information presentation mode in which the image represents customer-oriented information, and to operate in a staff-oriented information presentation mode in which the image represents staff oriented information, and to detect the approach of an external freely movable radio communication device relative to the electronic shelf label based on a received radio signal transmitted by the radio communication device, and to automatically activate the staff-oriented information presentation mode upon the detection of the approach of the radio communication device.

20 Claims, 5 Drawing Sheets

(51) Int. Cl.

| | |
|---|---|
| ***G06F 7/12*** | (2006.01) |
| ***G06F 15/00*** | (2006.01) |
| ***G07C 13/00*** | (2006.01) |
| ***G09G 5/00*** | (2006.01) |

(58) Field of Classification Search
USPC .......................................................... 705/22
See application file for complete search history.

(56) References Cited

U.S. PATENT DOCUMENTS

| | | | | |
|---|---|---|---|---|
| 11,803,723 | B2 * | 10/2023 | Tinney | G06K 19/06037 |
| 11,861,144 | B2 * | 1/2024 | Sung | G06F 3/147 |
| 2003/0132290 | A1 * | 7/2003 | Haulk | G06Q 20/201 235/383 |
| 2006/0178891 | A1 * | 8/2006 | Kratzenberg | G06Q 20/343 705/1.1 |
| 2009/0273443 | A1 * | 11/2009 | Nilsson | G06F 3/147 340/5.91 |
| 2010/0106588 | A1 * | 4/2010 | Jones | G06Q 30/0223 709/248 |
| 2010/0117796 | A1 * | 5/2010 | Claessen | G06K 19/0723 340/10.1 |
| 2010/0225444 | A1 * | 9/2010 | Nobutsugu | G06Q 10/087 235/487 |
| 2011/0186633 | A1 * | 8/2011 | Okabe | G06Q 10/08 235/492 |
| 2016/0026032 | A1 * | 1/2016 | Moore | G06K 7/10316 349/1 |
| 2016/0035012 | A1 * | 2/2016 | Abell | G06Q 30/0641 705/27.1 |
| 2017/0124603 | A1 * | 5/2017 | Olson | H04W 4/02 |
| 2018/0082245 | A1 * | 3/2018 | Jones | G06F 16/23 |
| 2019/0220805 | A1 * | 7/2019 | Johnson | G06Q 10/087 |
| 2019/0246232 | A1 * | 8/2019 | Singh | H04S 7/303 |
| 2019/0385490 | A1 * | 12/2019 | Stoop | G09F 3/208 |
| 2020/0064011 | A1 | 2/2020 | Nakano | |
| 2020/0301378 | A1 * | 9/2020 | McQueen | G05B 15/02 |
| 2022/0051310 | A1 * | 2/2022 | Graube | G06Q 10/087 |
| 2022/0130284 | A1 * | 4/2022 | Oosthoek | G09G 3/20 |
| 2024/0330619 | A1 * | 10/2024 | Morse | G01S 5/0269 |

OTHER PUBLICATIONS

International search report from WO Publication WO 2021/121643 A1 the Parent of the present application.

Communication pursuant to Article 94(3) EPC issued by the European Patent Office on May 19, 2026, which corresponds to European Patent Application No. 25 169 097.0-1207 and is related to U.S. Appl. No. 17/786,027.

* cited by examiner

ELECTRONIC SHELF LABEL WITH INTERACTION INTERFACE ACTIVATION

CROSS-REFERENCE TO RELATED APPLICATIONS

This is a 35 U.S.C. 371 National Stage Patent Application of International Application No. PCT/EP2019/086875, filed Dec. 20, 2019 which is hereby incorporated by reference in its entirety.

TECHNICAL FIELD

The invention relates to an electronic shelf label with interaction interface.

BACKGROUND

The international patent application published with publication number WO2017/097358A1 discloses an electronic shelf label with an interaction interface that can communicate with another electronic device by means of Near Field Communication (NFC) technology. The electronic device is a handheld barcode scanner which allows to link a product to a particular electronic shelf label. This is achieved by scanning the barcode on the product, which uniquely identifies the product, and by scanning the barcode displayed on the display of the electronic shelf label, which uniquely identifies the electronic shelf label. The acquired barcodes are then submitted to a central merchandizing server of a retail shop, where the link between the electronic shelf label and the product is digitally stored in a database. In the following the server supplies display data, which code product related information of the product linked with the electronic shelf label to the electronic shelf label and the display of the electronic shelf label displays the product related information in a human readable form.

Today shelf management tasks like the generation of instructions to remove expired products, restocking of products of a shelf, the manual counting of products on a shelf and the like are planned and coordinated by the aid of a personal computer. The personal computer is typically located in the shop's back office. There the instructions are than communicated to the staff orally or handed out in form of printed task lists for execution.

This process may delay the reactivity of the retailer's staff and execution of instructions may be error prone.

Therefore, the object of the invention is to provide an improved electronic shelf label or a shelf label system, respectively, which helps enhancing the reactivity of the service staff while reducing the probability of errors in shelf maintenance tasks.

SUMMARY OF THE INVENTION

This object is achieved by an electronic shelf label that comprises a display unit that is adapted to display an image, wherein the electronic shelf label is adapted to operate in a customer-oriented information presentation mode in which the image represents customer-oriented information, and to operate in a staff-oriented information presentation mode in which the image represents staff oriented information, and to detect the approach of an external freely movable radio communication device relative to the electronic shelf label based on a received radio signal transmitted by the radio communication device, and to automatically activate the staff-oriented information presentation mode upon the detection of the approach of the radio communication device.

This object is also achieved by an electronic shelf label system, that comprises a number of electronic shelf labels according to the invention and a number of freely moveable radio communication devices.

This object is also achieved by a method of operating an electronic shelf label, wherein according to the method a display unit of the electronic shelf label displays an image, wherein in a customer-oriented information presentation mode the image represents customer-oriented information, and wherein in a staff-oriented information presentation mode the image represents staff-oriented information, and the approach of an external freely movable radio communication device is detected relative to the electronic shelf label by the electronic shelf label based on a received radio signal transmitted by the radio communication device, and the electronic shelf label automatically activates the staff-oriented information presentation mode upon the detection of the approach of the radio communication device.

This object is also achieved by use of an approach detection in an electronic shelf label, wherein the approach of an external freely movable radio communication device is detected by the electronic shelf label based on the radio signal transmitted from the wireless communication device and wherein the approach detection is used to automatically activate an employee-oriented information display mode of the electronic shelf label, wherein in the employee-oriented information presentation mode the display unit displays an image representing employee-oriented information as distinct from a customer-oriented information display mode of the electronic shelf label in which the display displays an image representing customer-oriented information.

The measures according to the invention provide the advantage that all instructions that are of relevance to the retailer's staff can be provided directly at the shelf or more precise directly at the electronic shelf label, which shows the instruction on its display. The staff does not even need to know that instructions for a particular shelf are pending there. Such instructions are automatically presented by the display of the electronic shelf label as the staff approaches (walks closer to) the shelf or rail on which the electronic shelf label is installed. As soon as the approach is detected (or in other words as soon as the staff walks into a predefined range of signal detection) the electronic shelf label automatically changes its mode or operation from the customer-oriented information presentation mode into the staff-oriented information presentation mode.

The staff only needs to carry the external freely movable radio communication device with her or him. The radio communication device may be any battery powered device that broadcasts or transmits the radio signal only. For example, it can be embedded into an identify card of the staff, integrated into a bracelet or collar of the staff, or embedded into a watch of the staff worn on the wrist, or integrated into a mobile phone of the staff or a portable communication device used by the staff within the shop, or be realized as a key chain. In a preferred embodiment the radio communication device is a radio transmitter which allows to establish a (bidirectional) communication link with the electronic shelf label that comprises a compatible internal radio transmitter for the communication with the freely movable radio communication device. The external freely movable radio communication device may be assigned to an individual staff or a group of employees. Hence, the freely movable radio communication device may be individualized such that the particular staff or a group of employees can be uniquely identified. The communication link between the electronic shelf label and the radio communication device may further be set up as a secure link so to protect the data which may be necessary to validate a detected approach and to grant permission to automatically activate the staff-oriented information presentation mode.

The radio communication device may be embedded into an identification card or any other portable device that can be assigned to a particular staff or group of staff. Physically seen the radio communication device realizes a hardware-key that is necessary to unlock the staff-oriented information presentation mode when the staff who carries radio communication device comes closer to a shelf on which the electronic shelf label is installed. The automatic activation or in other words the mentioned unlocking of the staff-oriented information presentation mode happens over a distance, e.g. when the staff is still 0.5 to 1.5 meter or more, e.g. 2-4 meter, or even further away from the electronic shelf label. This of course requires that the transmitter installed in the freely movable radio communication device and the electronic shelf label are appropriately adapted to communicate over such distances.

This also differentiates the measures according to the invention from others which may be based on RFID (Radio Frequency Identification Device) or NFC (Near Filed Communication) which require a close proximity of a few millimetres up to a few centimetres between the communication partners. Such RFID or NFC based solutions also show the disadvantage that power for one of the communication partners must be provided by the radio signal of the other communication partner which reduce the reliability of such solutions.

In this context it is also highlighted that an activation of the staff-oriented information presentation mode within the mentioned distances provides the advantage that the instructions for an approaching staff can be displayed already while the staff is still in a remote distance from the shelf, from where the shelf is still out of reach. Typically, the staff's visual perception is still broad at a larger distance from the shelf and the staff may easily recognize that there is something to be checked at the shelf, because there the staff-oriented information presentation mode is activated, and staff-oriented information is displayed. Typically, such staff-oriented information is easily visual distinct-able from the customer-oriented information. As a consequence, the staff's attention is triggered and while coming closer to the shelf the details of the instructions will become clear.

A visible feature of the customer-oriented information presentation mode is that prices, product names and/or further product properties that are relevant for the promotion of a product are presented in a manner to attract the interest of a customer or to trigger purchase of the products.

A visible feature of the staff-oriented information presentation mode is that instructions or other information is displayed which gives sense to the staff but make little or no sense to customers. Such staff-oriented instructions may indicate actions to be executed by the staff directly at the respective shelf, e.g.: the instruction to re-stocking products into a shelf, the instruction to count the remaining products on a shelf in order to validate the number of products stored in the computer system of the shop, the instruction to check the expiry date of products stored in a shelf, the instruction to pick a product or a number of such products from the shelf, and the like.

The two information presentation modes are therefore distinct from each other with regard to their intended audience and finally with regard to the action intended to be trigged at the respective audience. The intended action is in case of the customer a purchase of products. The intended action is in case of the staff the maintenance of the shelfs.

However, this doesn't mean that the electronic shelf label may execute only one of the two information presentation modes during a time period. In fact, in certain situations it makes sense that both information operation modes are active concurrently. This may be the case if the computer system instructs staff to check the expiry date for perishable products directly at a particular shelf. While this instruction is displayed during the staff-oriented information presentation mode, the electronic shelf label may concurrently display the virtual (electronic) price label of the product concerned in the customer-oriented information presentation mode.

But concurrent appearance of the two information presentation modes may also exist during a transition from the one information presentation mode into the other information presentation mode and vis-versa. Such a transition phase may be executed during the coming closer of the radio communication device carried by the staff. In the transition phase the customer-oriented information may fade out while the staff-oriented information may fade in (simultaneously), for example as a function of (approximated or computed) distance between the electronic shelf label and the freely movable radio communication device or for example as a function of the duration in time during which a continued approach is detected.

The electronic shelf label may comprise a controller stage and a communication module for the communication with an access point which connects the electronic shelf label to a server of the retailer. With the server a stock inventory is managed. The server also stores the planogram and the link between the electronic shelf labels and the products assigned to the electronic shelf labels. The server also submits display data to the individual electronic shelf label. The display data may represent either the customer-oriented information or the staff-oriented information. These data are stored within a memory stage of the electronic shelf label which is accessible by the controller stage and dependent on the mode of operation the controller stage accesses the respective memory section, reads out the stored data and submits theses data via an internal data bus to the display unit. The display unit may be structured into a screen that displays the image and a display controller which receives the data from the controller stage and drives the screen accordingly. The screen may be of the passive type, which means reflective, or of the active type like LCD with backlit. Dependent on the applied technology the image may be a still image or a video image or a combination of a video image, e.g. a video played back in the background with a still image embedded into the video in a window, e.g. showing a virtual price label or other product or promotion information or the staff-oriented information. In a preferred embodiment the screen is realized as an LCD screen with a length of 1 meter or even up to 2 meters and the screen forms the front to of an edge of a shelf floor. There it may be attached to a conventional shelf rail or it may realize the shelf rail by itself. The height of the screen may be a few centimetres; in fact it should be similar to the height of common shelf rails or conventional paper-based price labels attached to the shelf rail in order to provide best legibility of the information presented there. The electronic shelf label can also be designed so that it can be placed on a table. In this configuration, it may have a fold-out leg that allows upright positioning on a table.

Further particularly advantageous embodiments and extensions of the invention arise from the dependent claims and the following description. It should be noted that certain features of a claim category can be transferred with appropriate adaptation to the other categories and achieve the same effects there.

According to a further aspect of the invention the electronic shelf label may be adapted to distinguish between a remote approach area and a near approach area and is adapted to prepare the staff-oriented information presentation mode if the approach within the remote approach area is detected, and to activate the staff-oriented information presentation mode if the approach within the near approach area is detected. This feature allows to distinguish between areas of different distance around the electronic shelf label, wherein the electronic shelf label performs different functions if the radio communication device is present in the different distance areas. For example, during approach in the remote approach area the electronic shelf label may only indicate to the staff that she or he entered into the approach detection zone, e.g. by displaying a red flashing symbol (a dot or a star or the like) in one of the corners of the display. This is also to confirm for to the staff that the electronic shelf label has detected the entry of the staff in the approach detection zone of the electronic shelf label. Further to this, this is also to confirm for the staff that the electronic shelf label has accepted the freely movable radio communication device and would be ready to fully activate the staff-oriented information presentation mode if the staff would come closer.

In order to realize all of these features the electronic shelf label comprises a radio signal sensing and pre-processing stage, which is adapted to sense the radio signal of the radio communication device and to deliver respective sensing data, and a controller stage a main controller) which is connected to the radio signal sensing and pre-processing stage and which is adapted to detect the approach of the radio communication device based on the received sensing data. The connection between the controller stage and the radio signal sensing and pre-processing stage is realized by the already mentioned data bus. The radio signal sensing and pre-processing stage comprises an antenna configuration for the reception of the radio signal from the freely movable radio communication device but also for the communication with this device via a bidirectional exchange of radio signals. The antenna configuration may have a single antenna but in a preferred embodiment a plurality of antennas will be present. The antenna configuration is connected to a transmitter electronics which may be combination of passive electronical components. Further to this, the radio signal sensing and pre-processing stage may comprise a signal processing stage that delivers the sensing data which represent a parameter that allows to evaluate if the received radio signal was transmitted within an approach detection zone or out of said approach detection zone. The signal processing stage may be realized by a separate integrated circuit (e.g. a custom-made chip that is designed to perform the described function) or by a combination of analogues and digital components that are available on the market. The signal processing stage may also be used to receive data from the controller stage and to send theses data to the external radio communication device, e.g. to establish said secure link or to request further information from the external radio communication device, which in turn may deliver the user specific data to authenticate the user and to authorise the respective set of staff-oriented information by the main controller.

In one embodiment the radio signal sensing and pre-processing stage is adapted to determine the signal strength of the received radio signal and to generate the sensing data such that they represent the signal strength of the received radio signal, and the controller stage (mentioned as the main controller) is adapted to evaluate the signal strength over time in order to detect the approach of the radio communication device. This solution may be the simpler but less accurate one and it requires a high sampling rate on the received radio signal in order to compute the path of the radio communication device as it is carried by the staff. In general, signal strength values that increase over time can be interpreted as an approach of the radio communication device while signal values that show a decrease over time can be interpreted as removing the emitting source from the electronic shelf label. One of the difficulties, however, identified in the simple time series analyses on the signal strength over time is the fact that it can be difficult to identify or avoid ambiguities in the outcome. Here one needs to understand that the radiation of the radio signal transmitted by the radio communication device may be of equal strength in all directions. It can therefore sometimes not be distinguished whether the received signal comes from a position behind an electronic shelf label or from a position in front of an electronic shelf label. The recognized approach would only be recognized correctly in the second case.

In order to avoid such an ambiguity, it is of particular advantage that the radio signal detection and pre-processing stage is arranged to determine the angle of arrival and/or the angle of departure of the received radio signal and to generate the sensing data to represent the angle of arrival or the angle of departure of the received radio signal, respectively, and the controller stage (mentioned as the main controller) is adapted to evaluate the angle of arrival or the angle of departure over time in order to detect the approach of the radio communication device. This solution requires an application of an antenna array to receive the radio signal of the radio communication device and the signal processing stage is adapted to evaluate the plurality of the signals available at the antenna array to determine the angle of arrival or the angle of departure, respectively. The sensing data now provide the information required to easily distinguish between a signal that was sent out from a location behind the electronic shelf label or from location in front of the electronic shelf label. This allows to focus on those radio signals coming from the corridor into which the display of the ESL is also directed. Other signals coming from a corridor to which the back of the display faces can be reliably excluded.

In addition, the sensing of the signal strength of the received radio signal immediately leads to a reliable proximity detection, because it is easy to see whether the radio communication device concerned is located in the corridor of the electronic shelf label or is located in a farther corridor. Hence, in a preferred embodiment both features, namely the determination of the signal strength and the determination of the angle of arrival or angle of departure are implemented. The controller stage will use both parameters to detect the approach of the radio communication device.

Further to this, the electronic shelf label is adapted to process the received radio signal according to a Bluetooth specification, in particular according to the Bluetooth 5.1 specification or higher. This allows an implementation that requires low power but provides sufficient reach of the radio signals.

The theoretical foundations for the determination of the Angle of Arrival (AoA) and the Angle of Departure (AoD)

are summarized in a publication of the company "SILICON LABS" under the title "Bluetooth Angle Estimation for Real Time Location", author Sauli Lehtimäki. Likewise, other methods are cited there namely Received Signal Strength Indicator (RSSI) and Time of Arrival/Time of Flight (TaO/ToF), which can be used in the present context. The implementation of these theoretical foundations in a computer program or the hardware structure (e.g. of an integrated circuit) are among the routine activities of a person skilled in the field of Bluetooth transmitter technology.

The controller stage (mentioned as the main controller) is adapted to activate the staff-oriented information presentation mode if the sensing data represent a criterion that passes a threshold. Such a threshold may be a certain signal strength of the received radio signal that is associated with a certain distance measured from the electronic shelf label. This association may be established by initial calibration either ex-factory or within the shop of the retailer so to take realistic environment conditions into account. Such a criterion may also be an angle of arrival that may be a larger angle or a narrow angle, e.g. dependent on the geometric condition of the corridor in which the display is oriented or of the surrounding of the electronic shelf label. The measurement of the angle can be made from a normal direction to the front of the display. The measurement can also be related to the plane of the screen. The respective reference direction only has to be pre-defined in advance.

In a preferred embodiment, however, a combination of signal strength and angle of arrival can be of advantage to define the threshold. This combination also allows to model an arbitrary border line of the threshold which follows a curve, wherein the distance from the electronic shelf label may depend on the actual angle of arrival (or departure) of the radio signal. For example, the threshold distance may be set as a function of angle such that it extends further to the left and right sides of the electronic shelf label into the corridor, whereas in an angular segment directly in front of the electronic shelf label it is at a much closer distance. Also, an asymmetric progression of the threshold distance to the left and right sides of the electronic shelf label may be envisaged.

According to a further aspect of the invention it may be of advantage if the controller stage (mentioned as the main controller) is adapted to keep the staff-oriented information presentation mode active as long as the sensing data represent a criterion within a threshold range. This means that departure out of the zone, which is delimited by the above-mentioned border line, which delimits the threshold range, will lead to termination of the staff-oriented information presentation mode. This automatic switch off feature guarantees that customers are not bothered with display content that is only intended for the staff and the staff does not need to remember to switch off the staff-oriented information presentation mode once she or he accomplished the shelf maintenance task. But the termination of the staff-oriented information presentation mode may also be forced by the staff while she or he is still within the threshold range, e.g. by interaction with a user interface of the electronic shelf label.

The automatic activation of the staff-oriented information presentation mode may be unconditional, which would lead to a situation in which the display may simply indicated that no information for the staff is available if upfront thereto no staff-oriented information was received. This could also result in employees unnecessarily turning their attention to shelves where there is really nothing to do. This situation could be detrimental to the efficiency of the staff. Therefore, it may be of advantage that controller stage (mentioned as the main controller) is adapted to activate the staff-oriented information presentation mode only if, in particular up-to-date, staff-oriented information is available, in particular stored, in the electronic shelf label. Such a conditional automatic activation of the staff-oriented information personation mode makes sure that staff is only triggered to be active at a certain shelf if there is something to do there. Preferably, a distinction can still be made with regard to the relevance. For example, if an activity was important at some point in time, and that activity cannot be completed within a certain period of time, then there is no point in keeping the activity urgent. The activity may then be deleted or continue to be pending and executed at a later date without urgency, e.g. during the next shift.

Further to this, it may be of advantage if the received radio signal conveys authentication data and the controller stage (mentioned as the main controller) is adapted to authenticate a person (to distinguish between individual staff) based on the received authentication data and to authorise this person (staff) for a set of staff-oriented information to be presented in the staff-oriented information presentation mode. In addition to unambiguously identifying an employee, this feature also allows differentiation between different groups of employees and associated permissions. Some of the employees may be allowed to re-stock the shelf. Therefore, only restocking information is presented to them on the staff-oriented information presentation mode. Other employees may be busy with pick and collect activities. Therefore, only pick and collect information is presented to them in the staff-oriented information presentation mode. Managers of the shop may be busy with setting price information or establishing a link between a virtual electronic price tag and a product. Therefore, only management-oriented information or system-information is presented to them in the staff-oriented information presentation mode.

In order to accomplish, start or even to organize certain task, it may be necessary to enter confirmations or to set certain parameters directly at the electronic shelf label. Hence, the electronic shelf label may comprise an input unit to receive user input.

According to the invention it is of particular advantage that the input unit is available, temporally available or not available in dependency of the different information presentation modes. For example, if only staff is allowed to perform inputs the input unit is only active during the staff-oriented information presentation mode. In order to avoid any faulty input, it may also be possible to limit the availability of the input unit to only a certain period in time during the staff-oriented information presentation mode. Such an implementation may be useful in a dialogue system application in which a dialogue between an electronic shelf label and an employee may take place. In this application the electronic shelf label may visualize information for the staff and the staff must than provide certain inputs on the input unit.

Such an input unit may be realized by an RFID or NFC interface. This type of interface may be used if only confirmation entries shall be received. Once a task communicated in the staff-oriented information presentation mode is accomplished by the staff, the staff may touch the electronic shelf label with its RFIC or NFC device and the RFID or NFC interface communicates this action via the data bus to the controller stage where the pending task is terminated. The termination of the task may be visualized in the staff-oriented information presentation mode so that the staff can recognize the positive feedback for the confirmation input before staff-oriented information presentation mode is terminated. The information regarding the termination of the task may be routed by the controller stage to the server.

The input unit may also be provided by the display unit itself, which may be realized as a touch screen. The display controller may than submit data that represent the user input on the screen via the data bus to the controller stage where such data are further processed or routed further to the server of the shop. Confirmation that the input was processed may be visualized in the staff-oriented information presentation mode before it is terminated.

According to a most preferred embodiment the input unit is arranged separate from the display unit by a resistive stripe-shaped touch sensitive unit that provides a touch-triggered signal. The magnitude or value of touch triggered signal is proportional to the position along the stripe-shaped where the touch takes place. Touch sensitive unit may also comprise a touch signal processing controller to deliver data that represent the touch-triggered signal. According to a further embodiment the touch-triggered signal may be directly processed by the controller stage if an analogue to digital converter input of the controller stage is used to input the touch-triggered signal.

Such a stripe-shaped touch sensitive device is, for example, available from the company named "spectrasymbol" (see spectrasymbol.com) under the product name "SoftPot". This stripe-shaped touch sensitive device is a passive linear position sensor which is powered by the electronic shelf label via two pins and delivers the touch triggered signal via a third pin if the touch force exceeds a minimum force level of 1 Newton. As mentioned, the touch-triggered signal has a linear dependence on the touch position along the touch sensitive area. The stripe-shaped touch sensitive unit is available as a straight stripe having a height of approximately 0.5 mm which makes it perfectly suitable for the attachment along the bottom wall of the housing of the electronic shelf label. Its touch sensitive surface faces away from the surface of the wall. It extends along the width of the screen of the display unit but can also be longer or shorter.

As already mentioned, the stripe-shaped touch sensitive unit requires a certain minimum force to detect a touch of a user's finger or hand. Such minimum force may be in the range of 0.5 to 2 Newton. This prevents the misrecognition of movements, which sometimes is not intended as touch, by the user, as sometimes observed with touch-sensitive screens. Overcoming the minimum force required to trigger the touch-triggered signal can also be interpreted by the controller stage as an acknowledgment or trigger for a processing operation.

The stripe-shaped touch sensitive unit may be located on the wall of the electronic shelf label that comprises or hosts the display unit. This may be of advantage because it can be seen immediately. On the other hand, this positioning will reduce the surface area of the front wall that is usable for image display by the display unit. Therefore, it is of advantage that the stripe-shaped touch sensitive unit is localized on a wall of the housing that is different from that wall of the housing which hosts the display unit. In this configuration the entire area of the front wall (probably reduced by a frame) is usable for the image display. Positioning outside the front wall also hides the touch sensitive unit. This is of particular importance if only staff is intended to interact with the touch sensitive unit and normal customers should not perceive it at all.

In particular, if the electronic shelf label is installed as intended at a shelf (this would be normally on the front edge of a shelf floor), the wall that host the display unit is the front wall and that wall that hosts the touch sensitive unit is the bottom wall. In a typical retail store, a shelf carries shelf floors and the electronic shelf labels are attached to the shelf floors such that the customer who passes by along the shelf mainly perceives the front wall of the electronic shelf with the display unit on it. The bottom wall of the electronic shelf label is typically invisible for a customer passing along the shelf. Such a customer typically focuses on the products on the shelf and after the desired product was found on the information provided by the display unit located on the front edge of shelf floor. Therefore, the bottom wall forms a natural hiding place from the eyes of the normal customer. This knowledge is, moreover, independent of the size of the electronic shelf label.

However, the positioning at the bottom wall becomes even more important if the electronic shelf label is realized as so-called video rail, which is arranged to display video images by its display unit. Such a video rail may be of significant length, e.g. up to or even larger than 1 meter. They may be directly attached to a shelf floor or substitute the shelf rail. Typically, a number of such video rails are installed directly side by side along a shelf floor, so that no use of the side walls facing each other is possible.

Further to this, the localization of the stripe-shaped touch sensitive unit separate from the display unit also has the advantage that the interaction with a user does not take place on the screen of the display unit itself. Advantageously, the interaction does not take place in line of sight on the screen. The interaction takes place outside the line of sight. Thus, image contents are visible at any time during the interaction and the screen is not contaminated by touch.

Further to this, the stripe-shaped embodiment of the touch sensitive unit not only allows a detection of a point-by-point touch but also the detection of an areal or sliding touch along the stripe-shaped touch sensitive unit.

The display screen of the display unit may be used to display certain information and the stripe-shaped touch-sensitive unit allows the user to efficiently interact, in particular provide interaction at certain positions along the width of the image reproduction area.

In operation, the display screen may, for example, display in the staff-oriented information prestation mode a menu bar along its bottom edge and the user (staff) may touch the touch sensitive area of the stripe-shaped touch sensitive unit at a certain position that corresponds to one of the menu items. In order to detect the menu item selection touch of a user, the processing unit may be arranged to accept only an exact coincidence of the touch position with the display zone of the menu item or, otherwise, the processing unit may accept a certain deviation therefrom. The processing unit may also be arranged to accept a touch within a certain area around the display zone of the menu item. As a consequence of this touch a function of the electronic shelf label is executed by the main controller. Such a function is associated with the menu item.

Given the fact that the electronic shelf label is intended to display virtual labels by its display screen, the exact positioning of such virtual labels is a typical challenge. In order to cope with this challenge, the controller stage is arranged to control the image-position, which is the position along the width of the image reproduction area where the image is to be displayed, and wherein the image-position is defined by the received touch-triggered signal which represents the touch-position. In an application example the display screen may show a virtual label, which for example flashes to distinguish it from other virtual labels that were already positioned, and the staff may tap at a certain position along the touch sensitive area. The processing unit then places the label exactly on the corresponding position on the screen and stops flashing. The virtual label is now positioned.

However, in a preferred embodiment the main processor is arranged to change the image-position along the first width of the image reproduction area in accordance with a detected continuous change of the touch position. This allows a staff to freely move an image, for example a virtual label, along the width if the image reproduction area, while keeping the finger pressed on the touch sensitive area and moving it along the touch sensitive area. The last selected position of the image will be frozen as soon as the touch ends. The sliding movement of a staff's finger along the touch sensitive area may be interpreted by the processing unit as absolute or relative position with regard to the position where the image is displayed within the image reproduction area. The interpretation as relative position may be of advantage for the usability as the staff may perform the sliding movement anywhere along the touch sensitive area while the image is moved within the image reproduction area relative thereto around its initial position. But also, a scaling of a staff's finger move along the touch sensitive area may be supported by the processing unit. This feature allows to transform a certain length of the movement of the finger into a different length of the movement of the virtual label. In this context a differentiation into a rough positioning and a precise positioning is possible. For example, in a first scaling operation the factor to transform the finger movement into a virtual label movement is larger than one and in the subsequent second scaling operation the factor to transform the finger movement into a virtual label movement is smaller than one. The two scaling operations may be separated by an interruption in the touch.

According to a further aspect of the invention also a control of operation modes within the staff-oriented information presentation mode may be implemented by the use of the stripe-shaped touch sensitive unit. In order to achieve this, it is of advantage that the controller stage is arranged to detect and to distinguish between a first touch-triggered signal and a second touch triggered signal, and to influence its operation mode accordingly. A first touch triggered signal may be a single touch event within a period of a certain first duration and a second touch triggered signal may be a multi touch event within a period of a certain second duration. Such multi touch events may also be distinguished by the position at which the individual touch takes place or by the duration between the individual touches. This feature is of particular advantage because it avoids the need to display a menu item before an operation mode can be activated by a touch at a corresponding position. Such operation modes can simply be initiated by performing the appropriate multi touch. The knowledge of such touch sequences may be limited to dedicated individuals in the group of users/operators of a retail shop.

If said first touch-triggered signal is detected, the controller stage is arranged to perform a logic link creation mode in which it is arranged to create a logic link between a product and a pre-defined virtual label. In this mode the electronic shelf label displays at a certain position a virtual label. The staff of the retail shop places a certain product on the shelf at the position where the virtual label is displayed. Finally, the employee initiates a capture of a picture of the barcode or the product label of the product. The picture may be captured by a small camera that is installed, for example, on the shelf and that delivers the picture data to a retail shop server. Than the employee touches the touch sensitive unit at the position of the virtual label in a manner so that it creates the first touch triggered signal. The touch sequence that leads to the creation of the first touch-triggered signal may be three touches within three seconds. The first touch triggered signal is detected by the controller stage and a communication with the server is initiated by the controller stage so that the virtual label concerned is linked to the product placed at the position of the virtual label. Now the digital link between the virtual label concerned and the product concerned is stored in the planogram of the shop.

If said second touch-triggered signal is detected, the processing unit is arranged to perform a position definition mode, in which it is arranged to define the position of a virtual label within the image reproduction area. Similar to the above said, for example, a touch sequence of two touch detections within two seconds at a position or within a certain range of position along the touch sensitive unit may be used to define the position of a virtual label according to the position or within said range of position at which the touch sequence was detected. Also, this information may be communicated to the server and stored in the planogram of the retail shop.

Further to this, various other operation modes may be initiated by the detection of a predefined touch triggered signal sequences within the staff-oriented information presentation mode.

It should generally be mentioned that the controller stage can also be arranged to reprocess the signals which can be picked up by the sensor, similar to those of a computer mouse. Here, a single touch within a short period of time is interpreted as a single mouse click. A double touch within a short period of time is interpreted as a double mouse click. And a persistent touch with change in position is interpreted as a movement of the mouse pointer. With this simple feature set, for example, one can activate a function for positioning a virtual label (single mouse click), change the position of the virtual label along the first width of the screen (movement of the mouse pointer), and finally freeze the final position of the virtual label (double mouse click) and much more.

In general, the realization of an electronic shelf label with the input unit allows to provide a number of functionalities which enrich the operation of the electronic shelf label. Here it is of particular advantage that the controller stage is arranged to control the display unit in dependency on the touch-triggered signal. In fact, all of these features enable a simple to handle user interface that does not require any other additional input devices beside the electronic shelf labels itself. Hence, all shelf related tasks of a shop can be performed directly at the shelf and no more cumbersome and error prone back-office coordination of tasks and employees is any more required.

The various devices, controllers or stages can be realized by analogue electronics or can also be realized with the aid of digital electronic components or assemblies, such as application specific integrated circuits (ASIC), microcontrollers, or even microprocessors in combination with corresponding peripheral components. With the aid of these digital electronic components or assemblies, software can be executed which provides the various mentioned functionalities.

These and other aspects of the invention are obtained from the figures discussed below.

BRIEF DESCRIPTION OF THE FIGURES

The invention is explained again hereafter with reference to the attached figures and on the basis of exemplary embodiments, which nevertheless do not limit the scope of the invention. In the different figures the same components are labelled with identical reference numbers. They show in schematic fashion in.

DESCRIPTION OF THE EXEMPLARY EMBODIMENTS

Figure 1A:
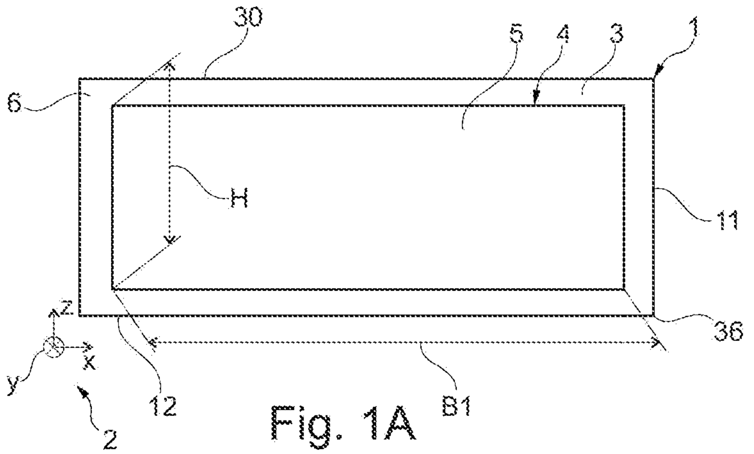
FIG. 1A-1C an electronic shelf label visualized in three different perspectives.
Figure 1B:
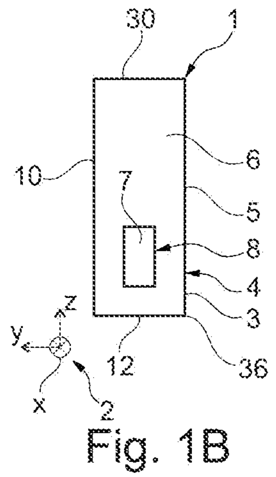
Figure 1C:
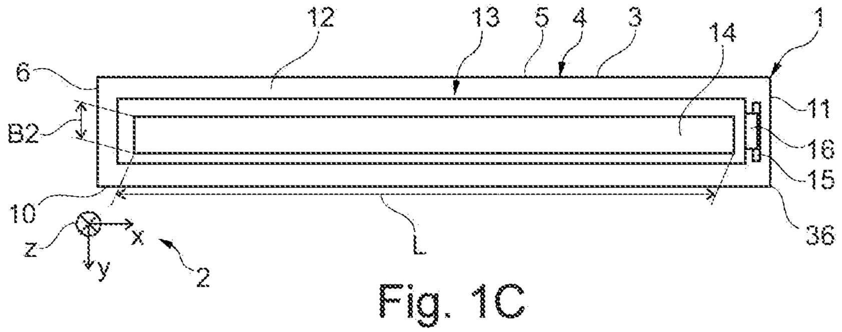

FIG. 1A-1C visualizes an electronic shelf label 1, in the following abbreviated as ESL 1, in three different views. Each of the FIGS. 1A-1C shows a different side of the ESL 1, in particular of its housing 36. Its housing walls are aligned with the planes of a cartesian coordinate system 2.

FIG. 1A shows a front wall 3 with a display unit 4 of which only a frameless image reproduction area 5, in the following abbreviated screen 5, is visible. The screen 5 shows a first width B1 and a height H. The y-axis of the coordinate system 2 points into the drawing surface.

The display unit 4 comprises beside the screen 5 the entire electronics required to display a still image or a video image.

FIG. 1B shows a left side wall 6 of the ESL 1 and a connection arrangement 7 of an interface 8, wherein the connection arrangement 7 is visible on the outside of the left side wall 6. The x-axis of the coordinate system 2 points into the drawing surface.

The connection arrangement 7 is arranged to be connected to a wire based combined power supply and signal/data bus 9 (see FIG. 7) in order to supply the ESL 1 with electrical power and to exchange data or signals with other devices. Dependent on the specific retailer's requirements the connection arrangement 7 may also be located on a rear wall 10 of the ESL 1. This eases direct connection with a corresponding connection arrangement of a shelf or shelf rail to which the ESL 1 is attached. The connection arrangement 7 may also be arranged in two parts, wherein on part of it is located on the left side wall 6 and the other part of it may be located on a right side wall 11 of the ESL 1. This allows to connect a number of ESLs 1 in a daisy chain configuration, while the rear wall 10 remains free accessible for a mechanical attachment to said shelf floor 34 or shelf rail. The interface 8 comprises beside the described connection arrangement 7 the entire electronics required to receive electrical power and to exchange data or signals. Here it is to mention that the interface 8 may also be arranged to supply power to the electronics of the ESL 1 by means of wires/cables and to exchange data/signals in a wireless manner.

FIG. 1C shows a bottom wall 12 of the ESL 1 on which a stripe-shaped touch sensitive unit 13, in the following abbreviated as unit 13, is attached by glue. To be precise, it shows the outer shape of the unit 13, its touch-sensitive area 14 which has a length L and a second width B2. The length L is equal to the first width B1. Further to this the bottom wall 12 also shows a gap-shaped (slit-shaped/slot-shaped) opening 15 trough which a connection part 16 of the unit 13 is fed into the inside of the casing of the ESL 1 where it is connected with the electronics of the ESL 1. However, the gap-shaped opening may also be located on one of the side walls or the rear wall 10 of the ESL 1.

The total length L may be in the range of 1 meter. This implies that the first width B1 of the screen 5 is of similar or identical width. The second width B2 may be in the order of 7 millimetres. The total width of the unit 13 may be around 20 millimetres. This implies that the bottom wall 12 may have a slightly larger width of approximately 30 millimetres. The unit 13 may be very slim, for example only 0.5 millimetres.

The z-axis of the coordinate system 2 points into the drawing surface.

Figure 2:
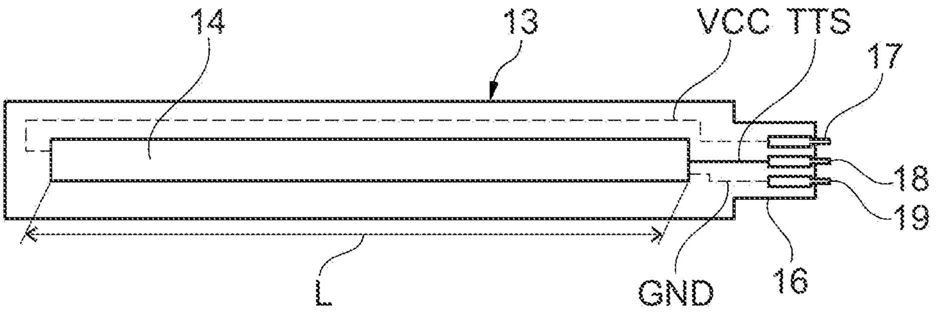
FIG. 2 a structure of a stripe-shaped touch sensitive unit.
Figure 3:
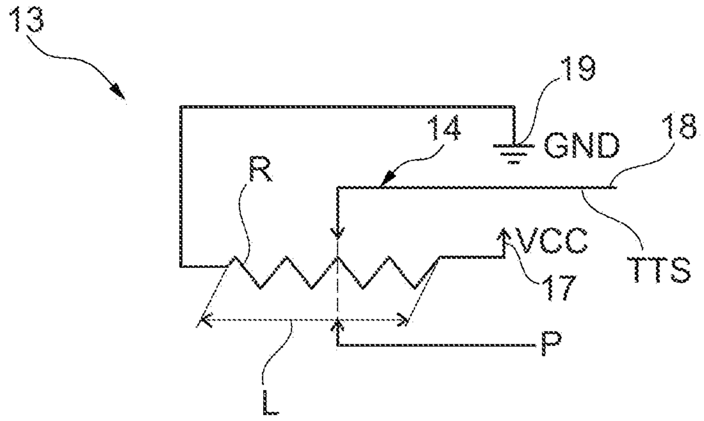
FIG. 3 an electronic scheme of the stripe shaped touch sensitive unit.

FIG. 2 in conjunction with FIG. 3 show some more details of the structure and the electronics of the unit 13. In particular, the connection part 16 comprises a first connection pin 17, a second connection pin 18, and a third connection pin 19. The unit 13 is a resistor based linear sensor that delivers a touch-triggered signal TTS at its pin 18 if it is touched with a minimum force of 1 Newton within its touch sensitive area 14 at a certain touch-position P (see FIG. 3). The touch-triggered signal TTS or more precisely its value shows a linear dependency on the touch-position P and represents the touch-position P along the length L of the touch sensitive area 14 at which the touch happens or occurs.

This is achieved by the electronics according to the electronical scheme shown in the FIG. 3. The unit 13 comprises along its touch sensitive area 14 a resistor R which is connected between the pins 17 and 19. The pin 17 is connected with an operation voltage VCC and pin 19 is connected with a reference potential GND of this operation voltage VCC. The inside of the touch sensitive area 14 is a conductor that is arranged to rest in a distance away from the resistor R if no force is applied to the touch sensitive area 14. It is connected with the pin 18. If a part of the touch sensitive area 14 is now pressed against the resistor R at a certain touch position P the voltage measured at that touch position P against the reference potential GND is picked up from there and available at the pin 18. For the avoidance of doubt, it is clarified herewith that the reference potential GND is also the reference potential of the electronics of the ESL 1. For example, the value of the operation voltage VCC may be 3 Volts and the value of the resistor R may be 20 k Ohm. This defines a current through the resistor which leads to a certain value of the voltage measured along the length of the resistor R against the reference potential GND. In other words, the voltage drop against the reference potential GND is (linearly) proportional to the touch position P along the resistor R.

When the touch position P is changed while maintaining the minimum force, the voltage value that can be measured at the stylus 18 changes according to the change in the touch position P.

Figure 4:
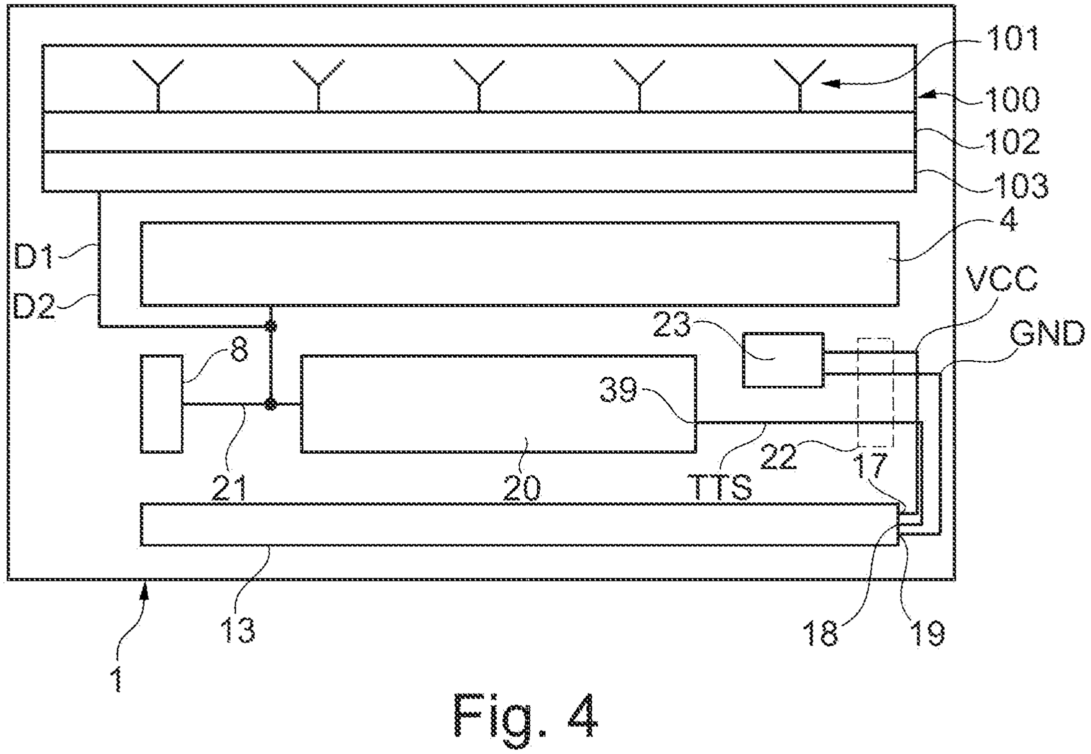
FIG. 4 a block diagram of the electronics of an electronic shelf label.

FIG. 4 now shows the integration of the unit 13 into the ESL 1 in form of a block diagram of the electronics of the ESL 1.

The ESL 1 comprises beside the already mentioned components also a controller stage 20, which is connected via a bus-system 21 to the display unit 4 and the interface 8. The electrical circuit board (not show in the FIG. 4) of the ESL 1 also comprises a connector 22 to connect with the pins 17-19. An operation voltage supply unit 23 supplies the operation voltage VCC and is connected with the pins 17 and 19. The operation voltage unit 23 may also be used to power the entire electronics of the ESL 1. It may receive electrical power from an external power supply (see FIG. 7, reference sign 38).

The pin 18 (shown in FIG. 2) is connected with an analogue to digital converter input 39 of the controller stage 20, which comprises an analogue to digital converter. The controller stage 20 is arranged to sample the touch triggered signal TTS and to compute the value of the sensed voltage and to provide certain functionalities which depend on the absolute value or the temporal change of the touch-triggered signal TTS or on the temporal sequences detectable in the touch-triggered signal TTS. Examples of this are shown in the following FIGS. 5 und 6.

Further to this the ESL 1 comprises a Bluetooth communication stage, which is realized to communicate in accordance with the Bluetooth 5.1 specification. The Bluetooth communication stage is structured into an antenna array 101, which is connected to an analogue electronic block 102, which is connected a communication controller 103.

The analogue electronics block 102 realises the analogue part for a transmitter functionality including power stage, receiver and transmitter electronics including modulation/demodulation and antenna adaptation and so on. It also allows the individual utilization of the antennas of the antenna array 101 to detect the angle of arrival of the received radio signal.

Figure 8:
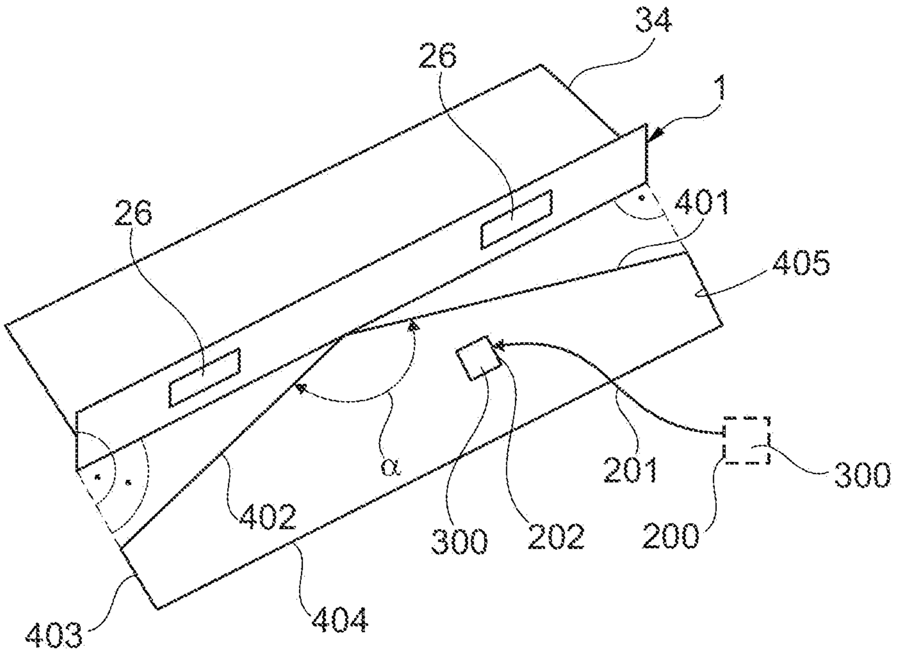
FIG. 8-9 an automatic activation and deactivation of a staff-oriented information presentation mode.
Figure 9:
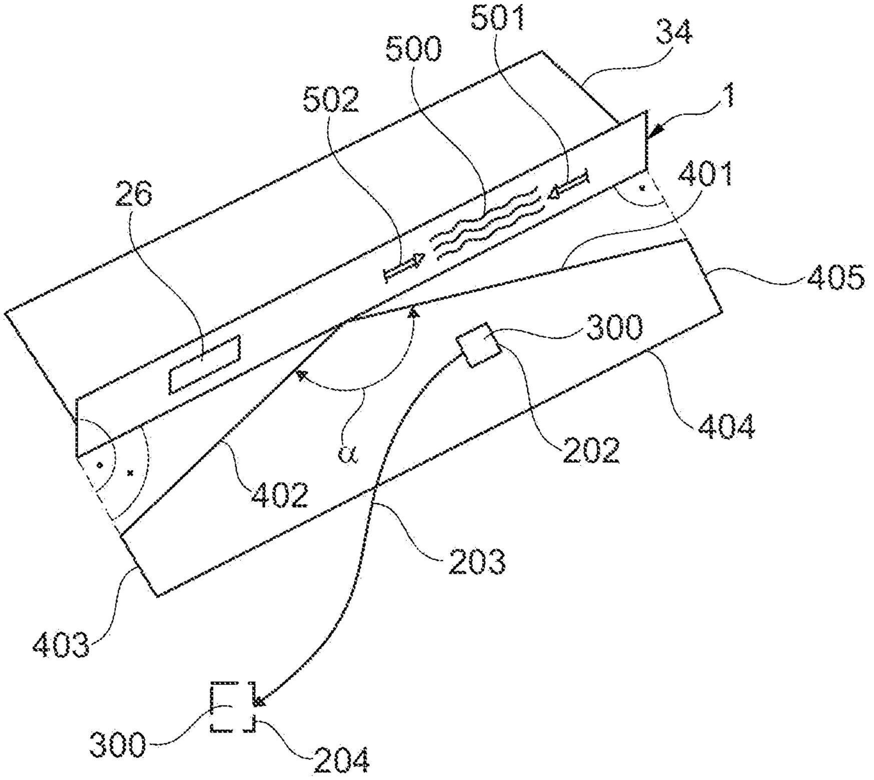

The communication controller 103 provides the digital processing necessary to communicate according to the Bluetooth 5.1 specification with an external freely moveable Bluetooth (BT) communication device 300 (see FIGS. 8 and 9). It is further programmed to process the individual signals received from the antennas in order to determine an angle of arrival of the received radio signal send out by the movable BT communication device 300. The determined angle of arrival is provided by first data D1 via the bus-system 21 to the controller stage 20. Further to this, the signal strength of the receives radio signal is determined and also provided by second data D2 over the bus-system 21 to the controller stage 20.

Hence, the communication stage realises a radio signal sensing and pre-processing stage 100, which is adapted to sense the radio signal received by the antenna array 101 and to pre-process the received radio signal and to deliver sensing data, which in the present case comprises the first data D1 and the second data D2, to the controller stage 20.

The controller stage 20 is programmed to analyse the received sensing data D1 and D2 and to detect the approach of the external radio communication device 300 based thereon. For example, the controller stage 20 is programmed to detect an approach of the external freely movable BT radio communication device 300 if the signal processing of the received BT radio signal indicates that the received radio signal originates from a direction defined by an angle of arrival range between 30° and 150° (measured from left to right end of the screen of the display unit 4) in front of the display screen of the display unit 4 and the distance from where the radio signal is sent out is less than 1 meter measured from the centre of the screen of the display unit 4.

If the approach is detection by the controller stage 20 the controller stage 20 is programmed to automatically activate a staff-oriented information presentation mode. In this staff-oriented information presentation mode information of relevance to staff of the shop is displayed. Such information of relevance for the staff may be instructions regarding shelf maintenance. If in the staff-oriented information presentation mode also user-input is needed, also the processing of the touch triggered signal TTS by the controller stage 20 will be involved. This means that the staff-oriented information presentation mode may present a fully functional user interface with visual output and tactile input directly on the ESL 1. This will be explained by the aid of a virtual label positioning mode which will be executed during the staff-oriented information presentation mode.

For example, the staff who carries the freely movable BT communication device 300 and approaches the respective ESL 1 and comes closer so that is approach is automatically detected as explained above is instructed to check the position of a virtual label on the screen. Therefore, the ESL 1 starts highlighting the respective virtual label and provides close to the virtual label the written staff-oriented instruction: "Please check my position. I indicate the price of tomatoes!". The employee may than perform a visual inspection of position of the virtual label. If the position of the virtual label doesn't match the corresponding product's position the employee can change the position of the virtual label by the aid of the touch sensitive unit 13 as will be explained in the following.

Figure 5:
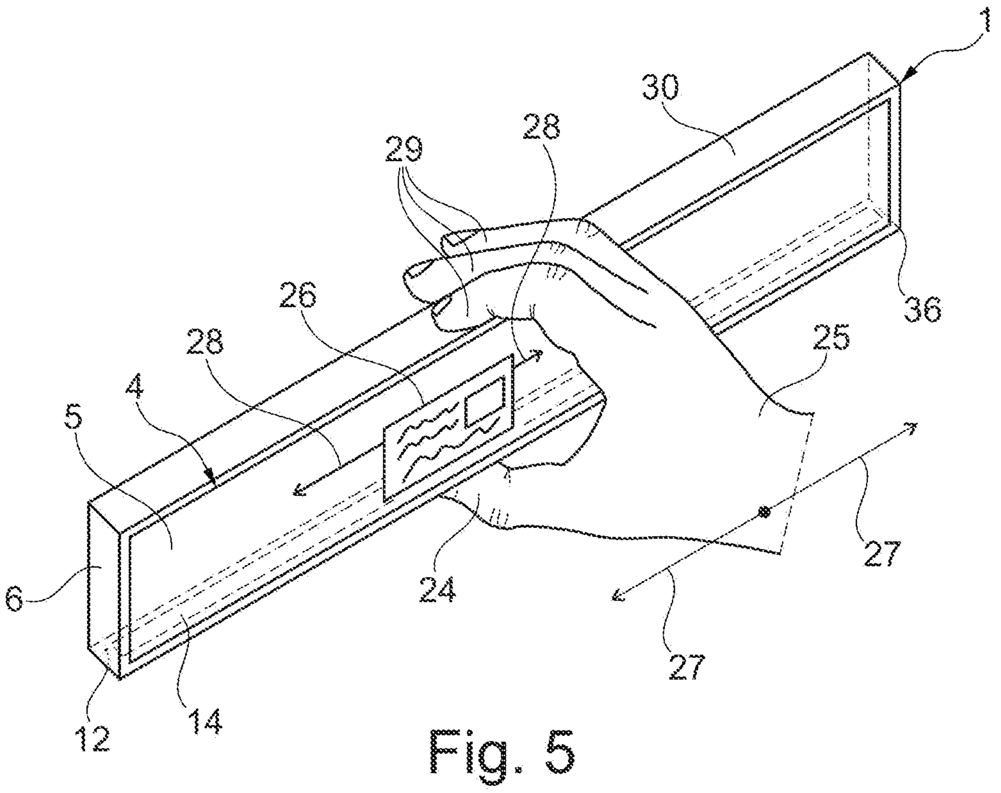
FIG. 5-6 the electronic shelf label with its touch sensitive unit in operation.

The FIG. 5 shows the interaction of a user (here staff or employee) (not shown) with the ESL 1 which is operated during the staff-oriented information presentation mode in the virtual label positioning mode. In particular it shows the interaction of a user's hand 25 with the unit 13. For the sake of simplicity, the above-mentioned instruction is not shown in the FIGS. 5 and 6.

Here the thumb 24 of the hand 25 touches the touch sensitive area 14 of the unit 13 with the required minimum force corresponding to the position of a virtual label 26 displayed on the screen 5. Then the user's hand 25 moves along the ESL 1 (visualized by first arrows 27) while the thumb 24 is continuously pressed against the touch sensitive area 14 with a force beyond the minimum force. During this interaction a temporal change in the value of the touch-triggered signal TTS occurs and this change is detected and processed by the controller stage 20 such that the position of the virtual label 26 moves on the screen 5 (see second arrows 28) in correspondence to the movement of the thumb 24 along the length L of the touch sensitive area 14. Advantageously the utilization of the thumb 24 during the interaction allows the user's others fingers 29 to support the hand 25 on an upper housing wall 30 of the ESL 1.

Figure 6:
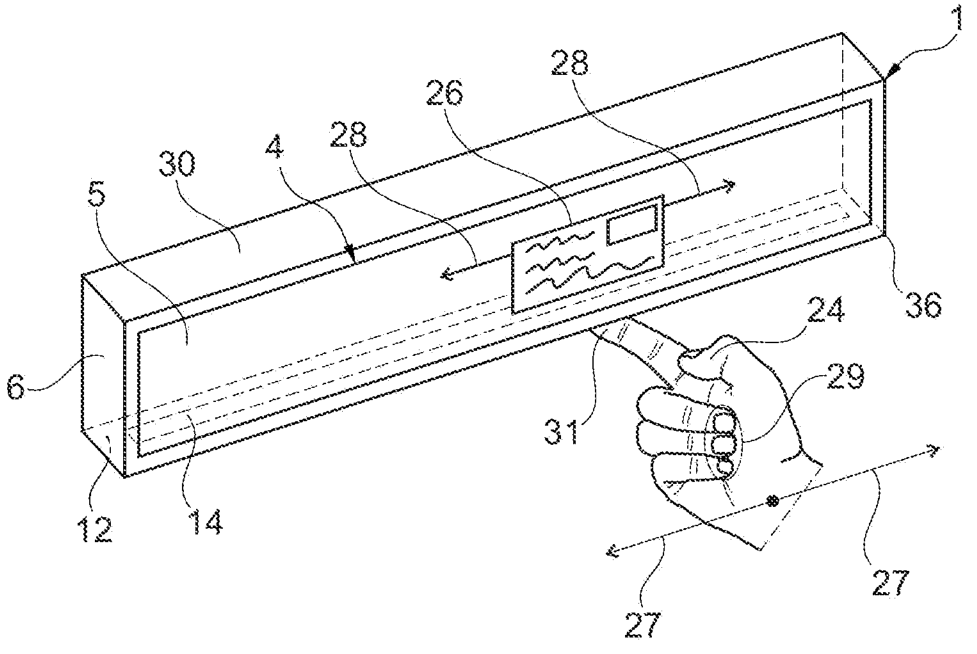

The FIG. 6 shows a further way of interaction with the touch sensitive area 14. Here only a pull finger 31 of the user's hand 25 is used to touch the touch sensitive area 14 with the required minimum force to generate the touch-triggered signal TTS. Again, the position of the virtual label 26 is changed in accordance with the movement of the pull finger 31 along the length L of the touch sensitive are 14.

As soon as the position of the virtual label fits with the corresponding product position, the employee may perform a double tap with the finder, which is interpreted as a confirmation of the last position set. Then the controller stage 20 terminates the processing of the touch triggered signal TTS so that no further input is possible.

The controller stage 20 checks its internal memory if further staff-actions are necessary and processes these staff-actions similar to the above explained procedure.

When all staff-actions are accomplished the controller stage 20 communicates this by means of a staff-oriented massage saying for example "Thank you for your support. Please proceed to shelf xyz". Thereafter, as soon as the employee now leaves the area in which the detection of its approach took place, the controller stage 20 automatically terminates the staff-oriented information presentation mode and the ESL 1 continues displaying only customer-oriented information in the customer-oriented information presentation mode.

If for whatever reason not all staff-actions are accomplished or can be accomplished and it is detected that the employee leaves the area in which its approach or presence can be detected, the controller stage 20 will anyhow automatically terminate the staff-oriented information presentation mode so that customers in the shop are not confused by the staff-oriented information and any interaction of unauthorized person can be avoided.

In this context it is to mention that the detection of approach can be accompanied by the identification of the person carrying the freely movable BT radio communication device 300 by the aid of identification data stored there and provided in a secure communication with the ESL 1. The controller stage 20 can distinguish between several levels of authorization to perform various staff-actions and make only those staff-actions available in the staff-oriented information presentation mode for which the identified staff is authorized.

For example, pick and collect staff that is picking and collection products for customers may be invited to take an indicated number of products out of the shelf and only need to quit the action by touching the touch sensitive unit 13 in a double touch manner.

Management staff may be invited to change the position of products and assign virtual labels at the new shelf position by using the touch sensitive unit 13. But also, amendments of the prices (based on recommendations of the server) may be possible directly on the ESL 1.

Further to this, also a point-to-point navigation may be provided by the ESL 1 in the staff-oriented information presentation mode. As big-data-processing is typically performed by a software that is executed on the server 37 of the shop or that is provided as a cloud-based shop management application, the software knows about all the staff-tasks pending within the shop. Hence, the ESL 1 may receive staff-tasks assigned by the shop management application and upon confirmation of completion of one task it may further provide navigation information to the staff where to find the next pending staff-task in the shop. For example, before terminating the staff-oriented information presentation mode the display unit 4 may display the information "Go to the shelf where the fresh milk is stored. There you receive further instructions". But beside such "absolute" information also "relative" information may be possible, like "walk in direction of the arrow indicated here until you see a flashing display on your right side. There you receive further instructions".

Figure 7:
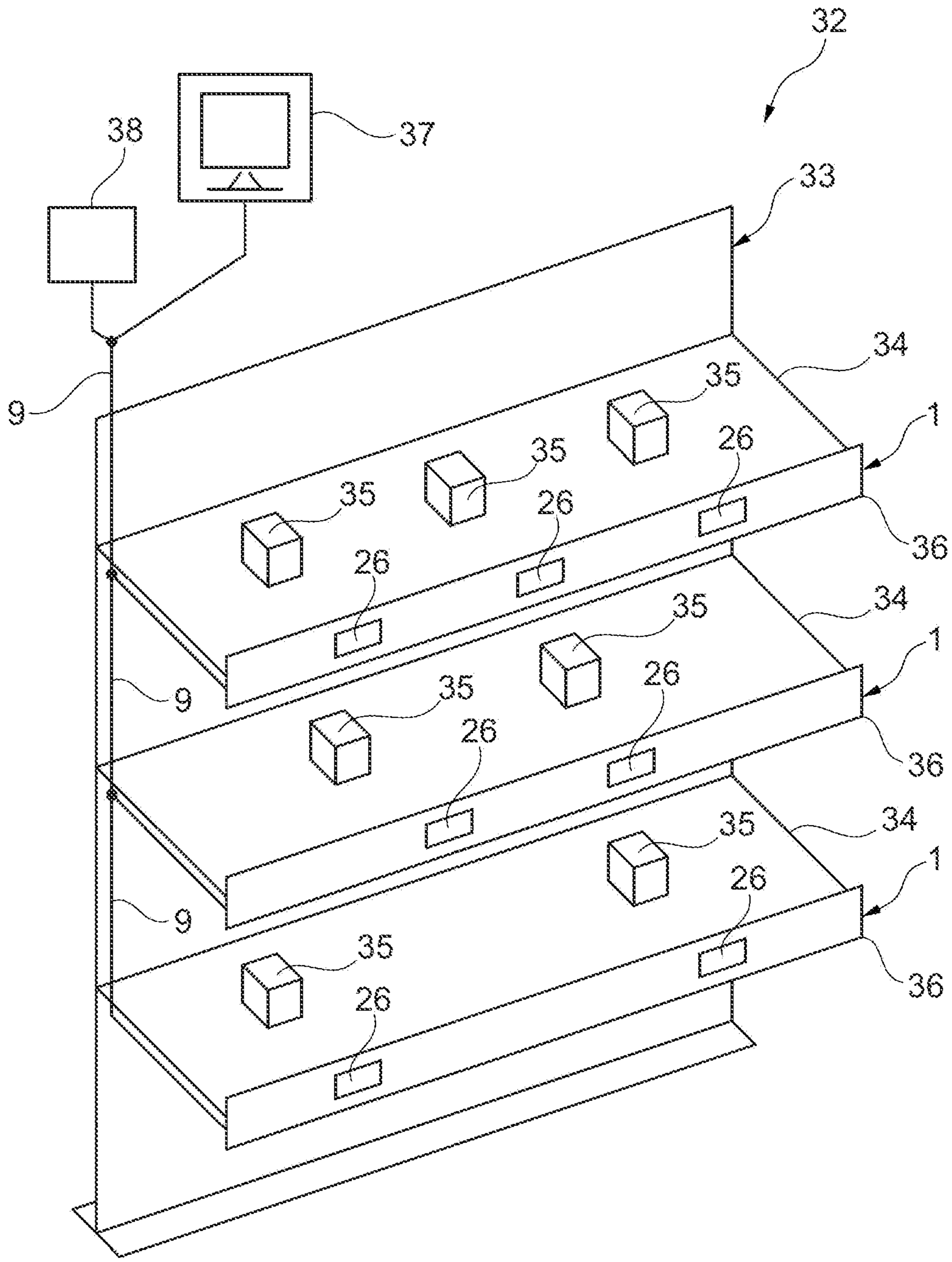
FIG. 7 an electronic shelf label system.

FIG. 7 shows an ESL system 32 which comprises a number of ESLs 1 installed on a shelf 33. Here the ESLs 1 realize a video rail which extends along the entire width of each shelf floor 34. The ESLs 1 are used to display a background colour or a background still image for each different shelf floor 34 or to display a background video either individually for each shelf floor 34 or a single background video split in stripes of which each stripe is displayed on a different ESL 1. Details of the background image display are not shown in FIG. 7. In addition, each ESL 1 displays virtual labels 26 that are positioned along the length of each ESL 1 in correspondence the position of products 35 placed on the respective shelf floor 34.

The positioning of the individual ESLs 1 was performed according to the details explained in the general description and in particular during the virtual label positioning mode as explained in connection with the FIGS. 5 and 6.

The virtual labels 26 are generated by a server 37 that also stores the planogram of the retail shop where the ESL system 32 is operated. The ESLs 1 are connected with the combined power supply and signal/data bus 9 to the server 37 and a power supply station 38 that supplies the electric power for the operation of the ESLs 1.

Finally, it is mentioned that also a number of ESLs 1 can be installed in a daisy chain configuration along a shelf floor 34 or a number of horizontally neighbouring shelf floors 34 (not shown).

In the following FIGS. 8 and 9 the change over from the deactivated into the activated and then back into the deactivated staff-oriented information presentation mode is visualized.

FIG. 8 shows the lower most shelf flor 34 of the shelf 33. Here the controller stage 20 operates in the customer-oriented information presentation mode and therefore shows two virtual labels 26.

Also visualized is the zone in which an approach of the freely movable BT communication device 300 can be detected because particular threshold parameters are programmed into the controller stage 20. This zone is visualized in a surface that extends in a plane oriented normal with regard to the screen 5 and is delimited by the lines 401-405. The course of the lines 401 and 402 is defined by the criterion that the opening angle (Alpha), measured at the centre of the screen 5, is 150°. This implies that the angle of arrival, measured with respect to the plane of the screen 5, must be between 15° and 165° for an approach to be detected. Further to this the detection of approach requires that the distance from the centre of the screen 5 in dependency on the angle of arrival between the mentioned extremes of 15° and 165° is a function of the actual angle of arrival in order to model the course of the lines 403 to 405, wherein line 404 runs in parallel to the screen 5 in a distance of 1 meter, which allows to compute the left and right border line 403 and 405, if like in the present case half of the width of the screen 5 is approximately 0.5 meters.

FIG. 8 shows how the BT communication device 300 is moved from a position 200 towards a position 202. As soon as it passes the line 404 at position 201 the controller stage 20 activates the staff-oriented information presentation mode. In this mode the content of the screen 5 changes as can be seen in FIG. 9.

Instead of the virtual label 26 on the right side now staff-oriented information 500 in form of legible instruction is presented which describes a task to be done and is bounded on the left and right by arrows 501 and 502. During the activated staff-oriented information presentation mode the customer-oriented information presentation mode remains active as can be seen because the virtual label on the left side is still visible. The employee performs the task while she/he rests at position 200. Thereafter, the employee moves in direction of position 203.

As soon as position 203 is reached, the controller stage 20 automatically terminates the staff-oriented information presentation mode and again the screen displays both virtual labels as shown in FIG. 8 while the user moves to position 204.

If at the end of the task an interaction with the touch sensitive stripe 13 is required also such an interaction can automatically terminate the staff-oriented information presentation mode.

Regarding the zone in which the detection of approach shall be performed it is to note that this zone can have any desired shape of curve or surface as the case may be. Also neighbouring ESLs 1 may have zones defined that overlap in order to have the staff-oriented information presentation mode active for a particular staff member on a plurality of ESLs 1 at the same time, e.g. along a shelf aisle. But even the zones of ESLs 1 that lie opposite one another in an aisle can overlap one another. This allows the simultaneous operation of ESLs 1 to both sides of the aisle in the staff-oriented information presentation mode. The current form and extent of the zone in which the approach can be identified can also depend on the respective staff-task.

Finally, let it be noted once again that the figures described in detail above only involve exemplary embodiments, which the expert can modify in a wide variety of ways without departing from the area of the invention. For the sake of completeness, let it also be stated that use of the indeterminate article "a" or "an" does not mean that the respective features cannot be present multiple times.

The invention claimed is:

1. An electronic shelf label that comprises:

a display that is configured to display an image;

at least one controller; and an antenna, wherein the at least one controller is configured:

to operate in a customer-oriented information presentation mode in which the displayed image includes customer-oriented information, to operate in a staff-oriented information presentation mode in which the displayed image includes staff-oriented information, the staff-oriented information presentation mode being different from the customer-oriented information presentation mode, to sense a radio signal transmitted by an external freely movable radio communication device and received by the antenna, to generate sensing data based on the sensed radio signal, to detect the approach of the external freely movable radio communication device relative to the electronic shelf label based on the sensing data, to determine an angle of arrival of the radio communication device based on the sensed radio signal and determine whether the angle of arrival is within a predetermined angle of arrival range, to automatically switch from the customer-oriented information presentation mode to the staff-oriented information presentation mode and display the staff-oriented information on the display upon the detection of the approach of the radio communication device based on the determination of whether the angle of arrival is within a predetermined angle of arrival range.

2. The electronic shelf label according to claim 1, wherein the at least one controller is further configured:

to distinguish between a remote approach area and a near approach area closer to the electronic shelf label than the remote approach area, to prepare the staff-oriented information presentation mode if the approach within the remote approach area is detected, and to activate the staff-oriented information presentation mode if the approach within the near approach area is detected.

3. The electronic shelf label according to claim 1, which comprises:

a radio signal sensing and pre-processing stage, which is configured to sense the radio signal of the radio communication device and to deliver the sensing data, and a controller stage which is connected to the radio signal sensing and pre-processing stage and which is configured to detect the approach of the radio communication device based on the sensing data, which is received from the radio signal sensing and pre-processing stage.

4. The electronic shelf label according to claim 3, wherein the radio signal sensing and pre-processing stage is further configured to determine the signal strength of the received radio signal and to generate the sensing data such that the sensing data represents the signal strength of the received radio signal, and the controller stage is further configured to evaluate the signal strength over time in order to detect the approach of the radio communication device.

5. The electronic shelf label according to claim 3, wherein the radio signal detection and pre-processing stage is further configured to determine the angle of arrival and/or an angle of departure of the received radio signal and to generate the sensing data such that the sensing data represents the determined angle of arrival and/or the determined angle of departure of the received radio signal, respectively, and the controller stage is further configured to evaluate the angle of arrival or the angle of departure over time in order to detect the approach of the radio communication device.

6. The electronic shelf label according to claim 1, wherein the at least one controller is further configured to process the received radio signal according to a Bluetooth specification.

7. The electronic shelf label according to claim 3, wherein the controller stage is further configured to activate the staff-oriented information presentation mode if the sensing data represent a criterion that passes a threshold.

8. The electronic shelf label according to claim 7, wherein the controller stage is further configured to keep the staff-oriented information presentation mode active as long as the sensing data represent a criterion within a threshold range.

9. The electronic shelf label according to claim 3, wherein the controller stage is further configured to activate the staff-oriented information presentation mode only if, in particular up-to-date, staff-oriented information is available in the electronic shelf label.

10. The electronic shelf label according to claim 3, wherein the received radio signal conveys authentication data and the controller stage is further configured to authenticate a person based on the received authentication data and to authorize the person for a set of staff-oriented information to be presented in the staff-oriented information presentation mode.

11. An electronic shelf label system, that comprises a number of electronic shelf labels according to claim 1 and a number of freely moveable radio communication devices.

12. The electronic shelf label system according to claim 11, wherein the electronic shelf labels and the radio communication devices are configured to communicate according to a Bluetooth specification with each other.

13. A method of operating the electronic shelf label according to claim 1, the method comprising:

displaying an image including the customer-oriented information on the display of the electronic shelf label when the electronic shelf label is in the customer-oriented information presentation mode;

detecting, by the electronic shelf label, the approach of the external freely movable radio communication device relative to the electronic shelf label based on the received radio signal transmitted by the external freely movable radio communication device, determining, by the electronic shelf label, that the angle of arrival is within the predetermined angle of arrival range, and upon the detection of the approach of the radio communication device and the determination of the angle of arrival being within the predetermined angle of arrival range, automatically switching from the customer-oriented information presentation mode to the staff-oriented information presentation mode different from the customer-oriented information presentation mode, wherein in the staff-oriented information presentation mode, the display of the electronic shelf label displays an image including the staff-oriented information.

14. A use of approach detection in the electronic shelf label according to claim 1, wherein the approach of the radio communication device is detected by the electronic shelf label based on the received radio signal transmitted from the radio communication device, and the angle of arrival being within the predetermined angle of arrival range is determined by the electronic shelf label, the use comprising:

upon the detection of the approach of the radio communication device and determination of the angle of arrival being within the predetermined angle of arrival range, automatically switching from the customer-oriented information presentation mode to the staff-oriented information presentation mode of the electronic shelf label, wherein in the staff-oriented information presentation mode, the display displays an image including the staff-oriented information, the staff-oriented information presentation mode being different from the customer-oriented information presentation mode of the electronic shelf label in which the display displays an image including the customer-oriented information.

15. The electronic shelf label according to claim 6, wherein the electronic shelf label is further configured to process the received radio signal according to the Bluetooth 5.1 specification.

16. The electronic shelf label system according to claim 12, wherein the electronic shelf labels and the radio communication devices are further configured to communicate according to the Bluetooth specification 5.1 with each other.

17. The electronic shelf label according to claim 1, wherein the at least one controller is further configured:

to automatically activate the staff-oriented information presentation mode and display the staff-oriented information on the display only if the angle of arrival is within a predetermined angle of arrival range, and to stay in the customer-oriented information presentation mode and display the customer-oriented information on the display if the angle of arrival is outside the predetermined angle of arrival range.

18. The electronic shelf label according to claim 1, wherein the predetermined angle of arrival range is configured to be within a corridor that includes the electronic shelf label.

19. The electronic shelf label according to claim 1, wherein the at least one controller is further configured:

to determine a distance to the radio communication device based on the received radio signal, to automatically activate the staff-oriented information presentation mode and display the staff-oriented information on the display only if the distance to the radio communication device is within a predetermined distance range, and to stay in the customer-oriented information presentation mode and display the customer-oriented information on the display if the distance to the radio communication device is outside the predetermined distance range.

20. The electronic shelf label according to claim 1, wherein the at least one controller is further configured:

to determine a distance to the radio communication device based on the received radio signal, and to automatically switch from the customer-oriented information presentation mode to the staff-oriented information presentation mode and display the staff-oriented information on the display when the radio communication device is within a threshold distance, further wherein the threshold distance is set as a function of the angle of arrival such that the threshold distance extends further to left and right sides of the electronic shelf label into a corridor that includes the electronic shelf label, whereas in an angular segment directly in front of the electronic shelf label, the threshold distance is shorter.

* * * * *